United States Patent [19]

Uchibaba

[11] Patent Number: 4,667,796
[45] Date of Patent: May 26, 1987

[54] HYDRAULIC CLUTCH

[75] Inventor: Kouichi Uchibaba, Kawagoe, Japan

[73] Assignee: Honda Giken Kogyo Kabushiki Kaisha, Japan

[21] Appl. No.: 809,585

[22] Filed: Dec. 16, 1985

[30] Foreign Application Priority Data

Jan. 12, 1985 [JP] Japan ................................. 60-3715
Jan. 12, 1985 [JP] Japan ................................. 60-3716
Jan. 12, 1985 [JP] Japan ................................. 60-3717

[51] Int. Cl.$^4$ ............................................. F16D 25/00
[52] U.S. Cl. ............................ 192/85 AA; 192/107 M
[58] Field of Search ............... 192/85 A, 85 AA, 96, 192/107 M

[56] References Cited

U.S. PATENT DOCUMENTS

| 2,648,618 | 8/1953 | Palumbo | 192/107 M |
| 2,704,646 | 3/1955 | Vogel | 244/75 R |
| 3,016,121 | 1/1962 | Mossacher | 192/91 R |
| 3,217,851 | 11/1965 | Mogk et al. | 192/85 AA |
| 3,370,682 | 2/1968 | McFarland | 192/85 AA |
| 3,554,860 | 1/1971 | Lacroix, Jr. | 162/145 |
| 3,664,472 | 5/1972 | Martini et al. | 192/12 R |
| 4,147,245 | 4/1979 | Folomin et al. | 192/85 AA |

FOREIGN PATENT DOCUMENTS 127956 11/1978 Japan ................................. 192/107 M Primary Examiner—John E. Murtagh
Assistant Examiner—Andrew Joseph Rudy
Attorney, Agent, or Firm—Darby & Darby

[57] ABSTRACT

A hydraulic clutch includes drive friction discs rotatably mounted around an output shaft, driven friction discs mounted around the output shaft against rotation relative thereto, a clutch pressure member mounted around the output shaft for movement therealong relative to a chamber plate fixedly mounted on the output shaft, the pressure member cooperating with the chamber plate to form a hydraulic pressure chamber. The drive and driven discs are movable along an axis of the output shaft. The pressure member has outlet port means communicating with the hydraulic pressure chamber. A clutch lifter member is mounted around the output shaft for movement therealong and is normally urged by urging means against the clutch pressure member to close the outlet port means. Fluid passageway means is connected to a source of pressurized fluid and communicates with the hydraulic pressure chamber for supplying the pressurized fluid thereinto to increase a pressure therein to urge the clutch pressure member toward alternately-disposed drive and drive friction discs, which are to drivingly couple them, thereby transmitting the rotation of said drive discs to the output shaft. Actuator means is operable to move the lifter member away from the clutch pressure member against the bias of the urging means to open the outlet port means to discharge the pressurized fluid therefrom to reduce the pressure in the hydraulic pressure chamber, so that the clutch pressure member is moved away from the drive and driven friction discs to discouple them.

11 Claims, 11 Drawing Figures

HYDRAULIC CLUTCH

BACKGROUND OF THE INVENTION

1. Field of the Invention

This invention relates to a hydraulic clutch of the multi-disc type for use in a motorcycle or the like.

2. Prior Art

One conventional hydraulic clutch 10 as disclosed in Japanese Patent Application Laid-Open (Kokai) No. 59-200818 comprises an annular drive member 12 attached to an input gear 14 rotatably mounted on a hollow output shaft 16, an annular driven member 18 fixedly mounted on the output shaft 16 for rotation therewith, an annular clutch pressure member 20 mounted on a central boss 18a of the driven member 18 for axial sliding movement and having a tubular portion 20a, and a clutch piston 22 mounted on the output shaft 16 and received in the tubular portion 20a of the clutch pressure member 20 held in sliding contact therewith at an outer periphery thereof. A plurality of drive friction discs or plates 24 are mounted on the drive member 12 for axial sliding movement while a plurality of driven friction discs or plates 26 are mounted on the driven member 18 for axial sliding movement, the drive and driven discs 24 and 26 being disposed alternately in closely spaced relation and being prevented from rotation relative to the drive and driven members 12 and 18, respectively. An annular hydraulic pressure chamber 28 for holding a pressurized fluid or oil is defined by the boss 18a of the driven member 18, the clutch piston 22 and the clutch pressure member 20. A clutch lifter plate 30 is secured to the clutch pressure member 20 through a bushing 32 and a bolt 34 in such a manner that the clutch lifter plate 30 is movable relative to the clutch pressure member 20 a distance h. An annular clutch spring 36 is interposed between the driven member 18 and the clutch lifter plate 30 to normally urge the clutch lifter plate 30 in a direction away from the driven member 18. The clutch pressure member 20 has a pressure-receiving wall 20b and a bore 20c in which a valve actuator pin 38 is received for axial movement, the valve actuator pin 38 having a rear end secured to the clutch lifter plate 30 while a front end of a reduced diameter is slidably fitted in an aperture 40 formed through the pressure-receiving wall 20b of the clutch pressure member 20. A valve outlet port 42 is formed through the pressure-receiving wall 20b for communicating the pressure chamber 28 with the bore 20c. A valve element 44 in the form of a reed is secured to the pressure-receiving wall 20b at one end thereof for closing the outlet port 42. The front end of the valve actuator pin 38 is spaced from the valve element 44 by a distance slightly less than the distance h. The valve element 44, the valve actuator pin 38 and the pressure-receiving wall 20b having the valve outlet port 42 constitute a hydraulic pressure control valve for controlling the operation of the clutch 10. Oil under pressure is fed from a source of pressurized oil to the pressure chamber 28 via a feed pipe 46 within the hollow shaft 16 and an inlet port 48 formed through the peripheral wall of the shaft 16. A lifter piece 50 is slidably received in the end of the hollow shaft 16, and a flange 50a of the lifter piece 50 is engaged with the clutch lifter plate 30 through a bearing 52. A cam shaft 54 has a cam surface 54a with which an outer end of the lifter piece 50 extending outwardly of the shaft 16 is engaged.

When the clutch 10 is in its engaged condition, the clutch lifter plate 30 is held away from the driven member 18 under the influence of the clutch spring 36 with the valve element 44 closing the outlet port 42. Therefore, the pressure in the hydraulic pressure chamber 44 is kept to a sufficient level to urge the clutch pressure member 20 toward the driven member 18 to hold the drive and driven friction discs 24 and 26 in firm engagement. Thus, the rotation of the input gear 14 driven for rotation by a drive gear (not shown) is transmitted to the output shaft 16 via the drive member 12, the drive and driven friction discs 24 and 26 and the driven member 28. For disengaging the clutch 10, the cam shaft 54 is rotated to move the lifter piece 50 inwardly through the cam surface 54a, so that the clutch lifter plate 30 is also moved inwardly against the bias of the clutch spring 36. In this case, the clutch lifter plate 30 is first moved a distance h, so that the front end of the control pin 38 urges the valve element 44 away from the pressure-receiving wall 20b of the clutch pressure member 20 to open the outlet port 42. As a result, the pressurized oil in the pressure chamber 28 is caused to flow through the outlet port 42, the bore 20c and a port 56 to reduce the pressure in the pressure chamber 28. In this condition, the drive and driven friction discs 24 and 26 are held together only under the force of the clutch spring 36. Upon opening of the outlet port 42, a control coil spring 58 acting between the clutch pressure member 20 and the clutch lifter plate 30 serves to keep them apart from each other a predetermined distance. This ensures that the engagement of the clutch 10 is started properly and that viscous drag occurring between the drive and driven friction discs 24 and 26 due to the presence of oil is positively prevented. A further rotation of the cam shaft 54 brings the clutch lifter plate 30 into engagement with the clutch pressure member 20 to move it toward the drive member 12, thereby bringing the drive friction discs 24 completely out of engagement with the driven friction discs 26.

Thus, with this conventional clutch 10, since the valve actuator pin 38 is first to be moved a distance h to open the outlet port 42 to reduce the pressure in the pressure chamber 28, the valve actuator pin 38 and those component parts operatively associated therewith must be set accurately in proper positions when assembling the clutch 10, and they must have great dimensional accuracy. In addition, the control spring 58 must be adjusted to a predetermined load. Therefore, the manufacturing cost of the clutch 10 as well as its maintenance cost is rather high.

SUMMARY OF THE INVENTION

It is therefore a primary object of this invention to provide a hydraulic clutch incorporating a hydraulic pressure control valve which is less complicated in construction, can be provided at lower costs, and requires less maintenance.

According to the present invention, there is provided a hydraulic clutch comprising:

(a) a rotatable output shaft;

(b) a drive member rotatably mounted on said output shaft;

(c) a driven member fixedly mounted on said output shaft for rotation therewith;

(d) a plurality of drive friction discs carried by said drive member for rotation therewith and for sliding movement relative thereto along an axis of said output shaft;

(e) a plurality of driven friction discs carried by said driven member for rotation therewith and for sliding movement relative thereto along the axis of said output shaft, said drive and driven friction discs being disposed alternately in closely spaced relation;

(f) a chamber plate fixedly mounted on said output shaft and disposed generally perpendicular to the axis of said output shaft;

(g) a clutch pressure member mounted around said output shaft for movement therealong relative to said chamber plate, said pressure member cooperating with said plate to form a hydraulic pressure chamber, said pressure member having outlet port means communicating with said hydraulic pressure chamber;

(h) a clutch lifter member mounted around said output shaft for movement therealong;

(i) urging means normally urging said lifter member against said clutch pressure member to close said outlet port means;

(j) fluid passageway means connectable to a source of pressurized fluid and communicating with said hydraulic pressure chamber for supplying the pressurized fluid thereinto to increase a pressure therein to urge said clutch pressure member toward said alternately-disposed drive and drive friction discs to drivingly couple them, thereby transmitting the rotation of said drive member to said output shaft; and (k) actuator means operable to move said lifter member away from said clutch pressure member against the bias of said urging means to open said outlet port means to discharge the pressurized fluid therefrom to reduce the pressure in said hydraulic pressure chamber, so that said clutch pressure member is moved away from said drive and driven friction discs to discouple them.

A shut-off valve is connected to the fluid passageway means for shut off the flow of the pressurized fluid therethrough when the outlet ports means is opened.

Many other advantages and features of the present invention will become manifest to those versed in the art upon making reference to the detailed description and the accompanying drawings.

DESCRIPTION OF THE PREFERRED EMBODIMENTS OF THE INVENTION

Figure 2:
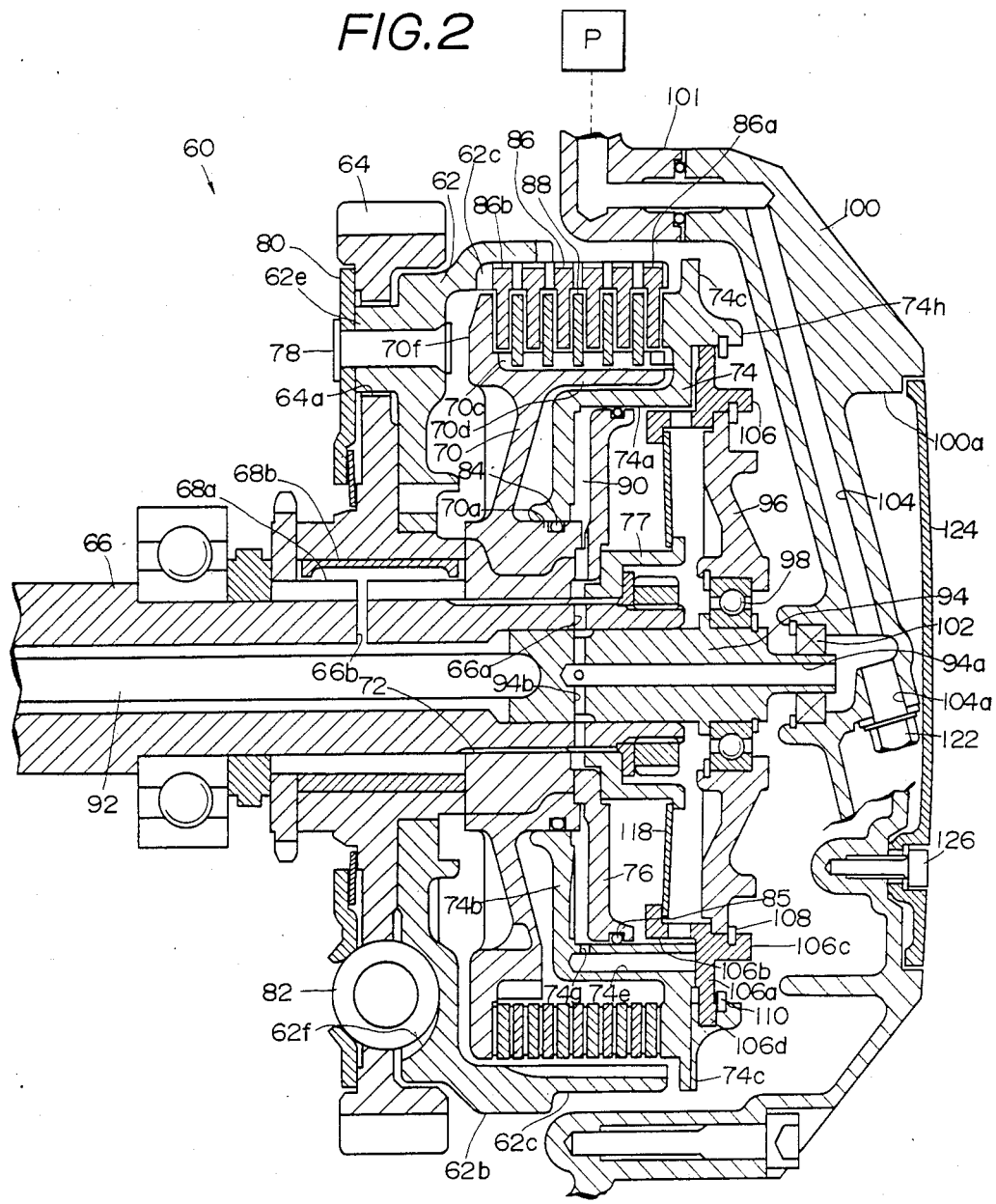
FIG. 2 is a cross-sectional view of a hydraulic clutch provided in accordance with the present invention.

A hydraulic clutch 60 shown in FIG. 2 comprises an annular drive member 62 mounted on an input gear 64 rotatably mounted on a hollow output shaft 66 through bearing means 68a and 68b, an annular driven member 70 fixedly mounted on the output shaft 66 through an integral collar 72 for rotation therewith, an annular clutch pressure member 74 mounted on a central boss 70a of the driven member 70 for axial sliding movement, and an annular chamber plate 76 mounted on a support ring 77 fixedly mounted on the output shaft 66. The chamber plate 76 is held between the boss 70a of the driven member 70 and the support ring 77 against axial movement. The clutch pressure member 74 has a tubular portion 74a which is slidably fitted on the chamber plate 76.

Figure 3A:
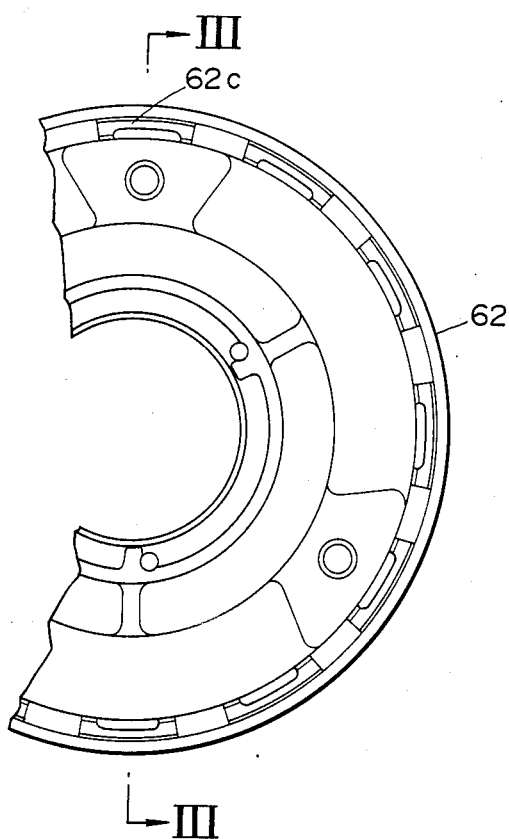
FIG. 3A is a partly-broken front elevational view of a drive member of the clutch of FIG. 2.
Figure 3B:
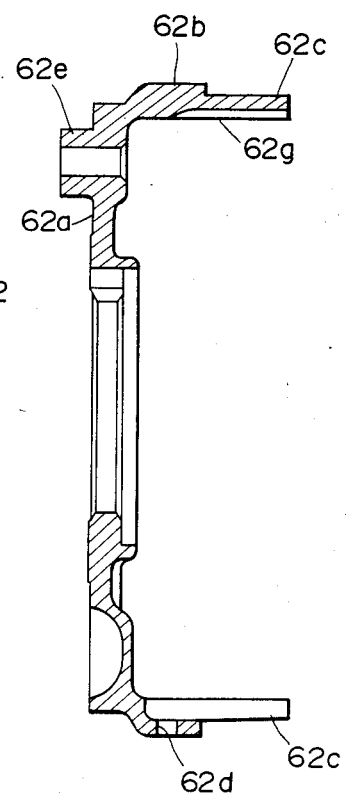
FIG. 3B is cross-sectional view of the drive member taken alon t line III—III of FIG. 3A.
Figure 3C:
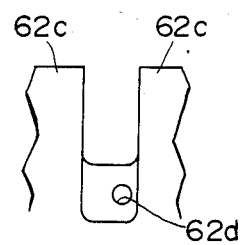
FIG. 3C is a fragmentary view of the drive member of FIG. 3A.

As best shown in FIGS. 3A to 3C, the drive member 62 includes a radial base portion 62a, a tubular reinforcement portion 62b of a small length extending from one face of the base portion 62a, and a plurality of axial arms 62c extending from the reinforcement portion 62b in circumferentially spaced relation. An aperture 62d is formed through the reinforcement portion 62b between each adjacent arms 62c. The drive member 62 has a projection 62e extending from the other face of the base portion 62a and slidably received in an arcuate slot 64a formed in the input gear 64, the drive member 62 being connected to the input gear 64 by a pin 78 passing the drive member 62 and an annular mounting plate 80. With this construction, the drive member 62 is slightly angularly movable relative to the input gear 64. A damper spring 82 is carried by the input gear 64 and is received in a groove 62f in the drive member 62 to absorb a shock when the clutch 60 becomes engaged. A seal ring 84 mounted around the boss 70a of the driven member 70 provides for a fluid-tight seal between the boss 70a and the inner peripheral surface of the clutch pressure member 74 which are held in sliding contact with each other. Also, a seal ring 85 forms a seal between the outer periphery of the chamber plate 76 and the tubular portion 74a of the clutch pressure member 74 which are held in sliding contact.

A plurality of drive friction discs or plates 86 are mounted on the drive member 62 for axial sliding movement while a plurality of driven friction discs or plates 88 are mounted on the driven member 70 for axial sliding movement, the drive and driven discs 86 and 88 being disposed alternately in closely spaced relation and being prevented from rotation relative to the drive and driven members 62 and 70, respectively. More specifically, the drive member 62 has an axial spline 62g (FIG. 3B) formed on an inner surface of each arm 62c, and each of the drive friction discs 86 has circumferentially-spaced notches formed in an outer periphery thereof and received respectively in the splines 62g, so that the friction discs 86 are prevented from rotation relative to the drive member 62. Similarly, the driven member 70 has axial splines 70c on outer surfaces of axial arms 70d, and notches in the inner periphery of the driven friction discs 88 are received in the splines 70c, respectively.

Figure 4A:
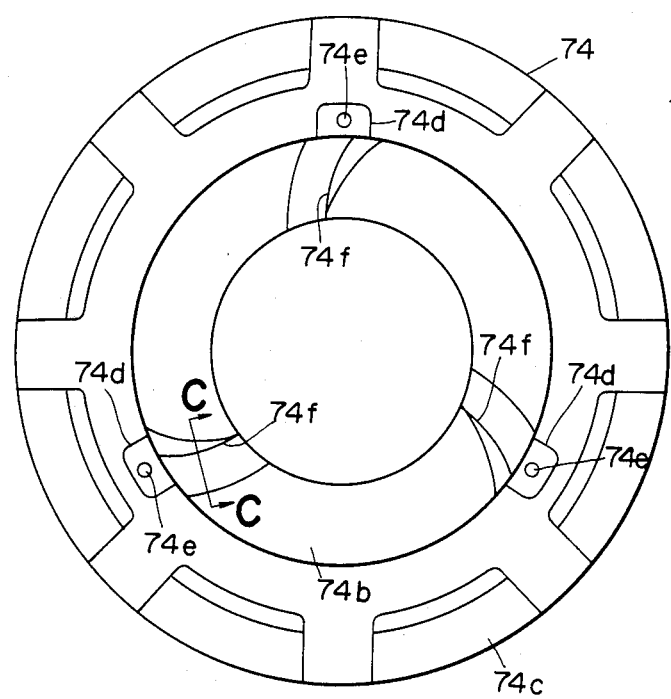
FIG. 4A is a front elevational view of a clutch pressure member of the clutch of FIG. 2.
Figure 4B:
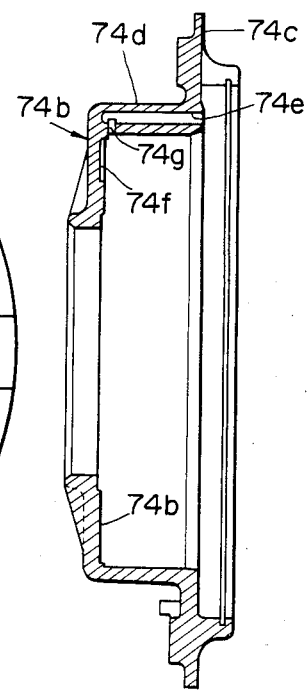
FIG. 4B is a cross-sectional view of the clutch pressure member taken the line IV—IV of FIG. 4A.
Figure 4C:
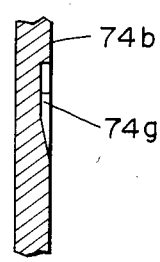
FIG. 4C is a fragmentary cross-sectional view of the clutch pressure member of FIG. 4A.

As best shown in FIGS. 4A to 4B, the clutch pressure member 74 has a pair of radial inner and outer flanges 74b and 74c formed respectively around the inner and outer peripheries of the tubular portion 74a at opposite ends thereof. An annular hydraulic pressure chamber 90 for holding a pressurized hydraulic fluid or oil for operating the clutch 60 is defined by the tubular portion 74a, the inner flange 74b, the boss 70a of the driven member 70 and the chamber plate 76. Three elongated hollow portions 74d are formed on the tubular portion 74a in circumferentially equally spaced relation and extend axially thereof. Each of the hollow portions 74d has an axial bore 74e opening to the outer surface of the outer flange 74c, the axial bore 74e serving as an outlet port. Three guide grooves 74f are formed in one surface of the inner radial flange 74b facing the chamber plate 76 and extend generally radially from an inner to outer periphery thereof. The three guide grooves 74f are slightly spirally disposed. Three apertures 74g are formed through the tubular portion 74a adjacent to the one surface of the inner radial flange 74b to communicate the hydraulic pressure chamber 90 with the outlet ports 74e, the apertures 74g being disposed in registry with the radial outer ends of the three guide grooves 74f, respectively.

The outer flange 74c is disposed in closely spaced, opposed relation to the outer end of the arms 62c of the drive member 62, and the outer diameter of the outer flange 74c is substantially equal to a circle in which the outer surfaces of the arms 62c of the drive member 62 lie. And, the outer diameter of the outer flange 74c is greater than those of the drive and driven friction discs 86 and 88.

A lifter rod 92 is received within the hollow output shaft 66 for movement therealong, and an elongated movable piece 94 of a circular cross-section is slidably received in an end of the output shaft 66. One end of the lifter rod 92 is secured to the inner end of the movable piece 94 for movement therewith. The movable piece 94 has an axial fluid passageway 94a opening to an outer end thereof, and a transverse fluid passageway 94b extending transversely therethrough and intersecting the passageway 94a. The input shaft 66 has a port 66a with which the transverse passageway 94b is brought into and out of registry as later described.

A clutch lifter disc 96 is mounted through a bearing 98 on the outer end portion of the movable piece 94 extending outwardly of the input shaft 66. The movable piece 94 has an outer end of a reduced diameter which is slidably supported on a clutch cover 100 through an annular seal member 102. The clutch cover 100 is attached to a clutch body 101 and has a fluid passageway 104 communicating with the fluid passageway 94a of the movable piece 94.

Figure 5:
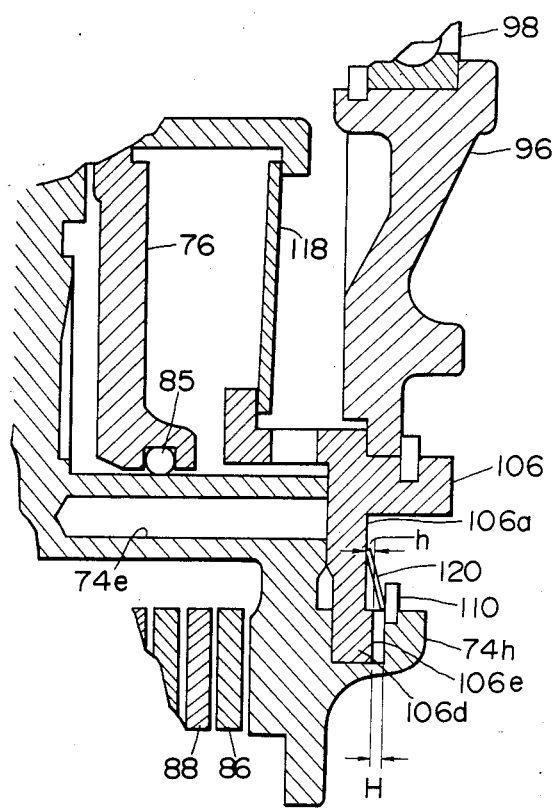
FIG. 5 is an enlarged cross-sectional view of a portion of the clutch of FIG. 2, showing the interrelation between the clutch pressure member and a clutch lifter member.

An annular lifter member 106 has a radial base portion 106a, a pair of annular portions 106b and 106c formed on the opposite faces of the radial base portion 106a, and four engaging arms 106d extending radially outwardly from the radial portion 106a in circumferentially equally spaced relation. The lifter member 106 is interposed between the clutch pressure member 74 and the lifter disc 96 with the four engaging arms 106d held in sliding contact with an inner peripheral surface of an annular portion 74h of the clutch pressure member. The lifter member 106 is fixed to the lifter disc 96 by a retainer ring 108 carried by the annular portion 106c and is slightly axially movable relative to the clutch pressure member 74. More specifically, a retainer ring 110 is mounted on the annular portion 74h of the clutch pressure member 74. As best shown in FIG. 5, each of the arms 106d has a projection 106e on one surface facing the retaining ring 110 at its radial outer end, the projection 106e being engageable with the retainer ring 110. The lifter member 106 is movable relative to the clutch pressure member 74 between the hollow portions 74d and the retainer ring 110 a predetermined distance H. A spring 120 is interposed between a respective one of the arms 106b and the retaining ring 110 so as to act between the lifter member 106 and the clutch closure member 74.

An annular clutch spring 118 is interposed between and engaged with the annular portion 106b of the lifter member 106 and the outer periphery of the support ring 116 to urge the lifter member 106 against the clutch pressure member 74, so that the open ends of the outlet ports 74e are closed by the radial portion 106a of the lifter member 106. The clutch spring 118 also serves to urge the clutch pressure member 74 toward the driven member 70 through the lifter member 106 to assist in pressing the drive and driven friction discs 86 and 88 together.

The fluid passageway 104 in the clutch cover 100 is connected to an oil pump P, and oil under pressure is adapted to be fed from this oil pump via the passageway 104, the passageway 94a in the movable piece 94, the passageway 94b to the hydraulic pressure chamber 90. The passageway 104 has an open end 104a opening to a cavity 100a in the clutch cover 100, and a bolt 122 is threaded into the open end 104a. A cover plate 124 is removably attached by a bolt 124 to the clutch cover 100 to cover the cavity 100a and hence the open end 104a. For measuring the pressure of the oil in the passageway 104, the cover plate 124 is removed from the clutch cover 100 to expose the open end 104a of the passageway 104 to the exterior of the clutch 60, and the bolt 122 is removed from the open end 104a. Thus, the open end 104a is easily accessible from outside the clutch 60, which facilitates the measuring of the oil pressure.

The operation of the clutch 60 will now be described. When the clutch 60 is in its engaged condition, the lifter member 106 is urged against the clutch pressure member 74 by the clutch spring 118, so that the open ends of the outlet ports 74e are closed by the radial portion 106a of the lifter member 106. And, the transverse passageway 94b of the movable piece 94 is disposed in registry with the inlet port 66a in the output shaft 66, so that the pressure in the hydraulic pressure chamber 90 is kept sufficiently high to apply an axial force to the radial inner flange 74b of the clutch pressure member 74 to urge the clutch pressure member 74 toward the driven member 70 to press the drive and driven friction discs 86 and 88 together between the radial outer flange 74c and a radial flange 70f of the driven member 70, thereby drivingly coupling the drive and driven discs 86 and 88. In this condition, the force of the clutch spring 118 also contributes to hold the drive and driven friction discs 86 and 88 in firm engagement. Thus, the rotation of the input gear 64 is transmitted to the output shaft 66 via the drive member 62, the drive and driven friction discs 86 and 88 and the driven member 70.

When the clutch 60 is to be disengaged, a clutch lever (not shown) operatively connected to the lifter rod 92 is manipulated to slightly move the lifter rod 92 in a right-hand direction (FIG. 2) to move the movable piece 94 axially outwardly. As a result, the fluid passageway 94b is brought out of registry with the inlet port 66a to interrupt the supply of the pressurized oil to the hydraulic pressure chamber 90, and simultaneously the lifter disc 96 is moved outwardly. At this time, the lifter member 106 is also moved axially relative to the clutch pressure member 74 against the bias of the clutch spring 118, so that the radial portion 106a of the lifter member 106 is brought out of contact with the open ends of the outlet ports 74e. As a result, the oil in the hydraulic pressure chamber 90 is discharged from the outlet ports 74e via the respective apertures 74g, so that the axial force produced by the pressure in the pressure chamber 90 and applied to the drive and driven friction discs 86 and 88 is released. Upon a further movement of the lifter rod 92, the lifter member 106 is moved together with the clutch pressure member 74 away from the driven member 70, so that the force to pressing the drive and driven discs 86 and 88 together is completely released to disengage the clutch 60. For engaging the clutch 60 again, the aforesaid clutch lever is released to return the lifter rod 92 into its retracted position to communicate the fluid passageway 94b with the inlet port 66a and also to bring the radial portion 106a of the lifter member 106 into sealing engagement with the open ends of the outlet ports 74e, thereby increasing the pressure in the hydraulic pressure chamber 90, as described above. Thus, the radial portion 106a of the lifter member 106 and the hollow portions 74d having the respective outlet ports 74e constitute a hydraulic pressure control valve for controlling the pressure in the hydraulic pressure chamber 90.

Figure 1:
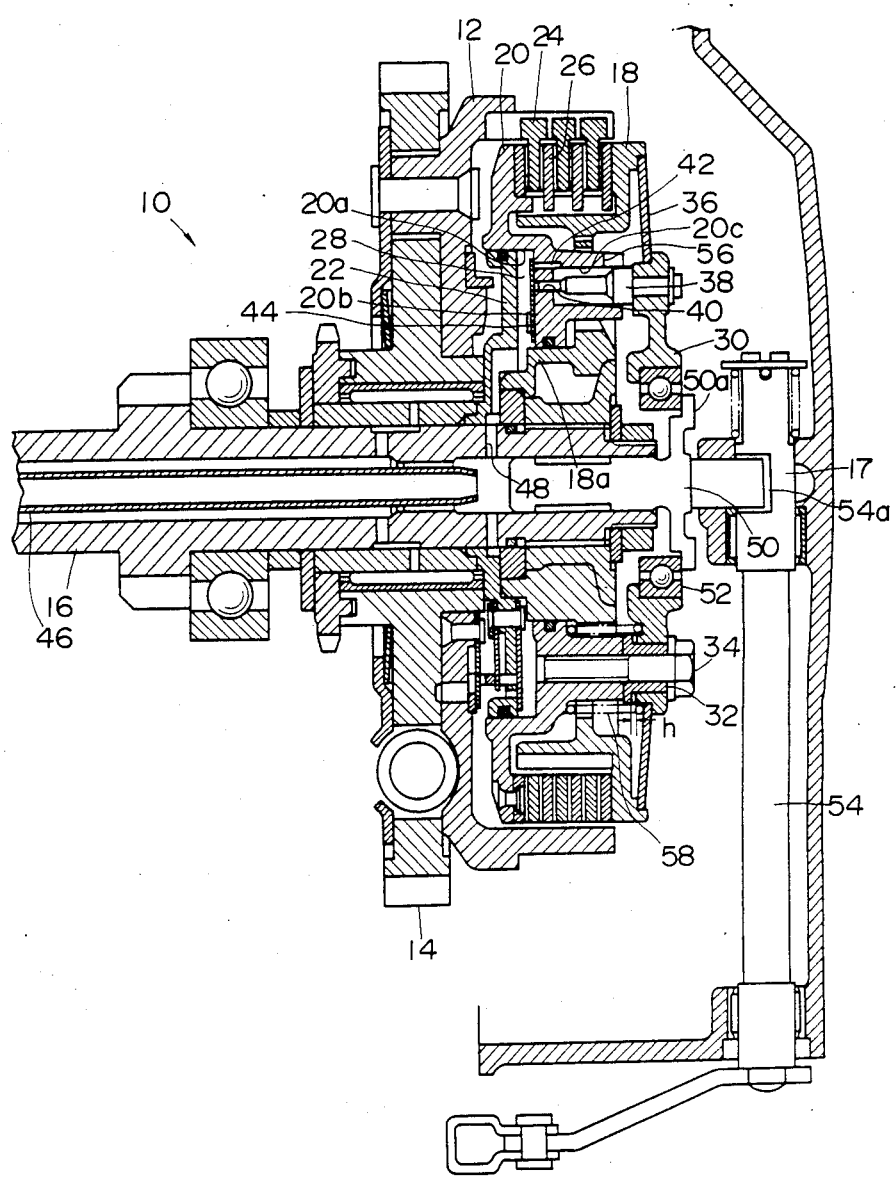
FIG. 1 is a cross-sectional view of a hydraulic clutch provided in accordance with the prior art.

As described above, for controlling the hydraulic pressure control valve, the lifter member 106 is merely moved toward and away from the clutch pressure member 74 to bring the radial portion 106a of the lifter member 106, serving as a valve closure member, into and out of engagement with the open ends of the hollow portions 74d to close and open the outlet ports 74e. This arrangement obviates the need for a valve actuator pin for urging the valve closure member as is the case with the conventional clutch of FIG. 1, and too much dimensional accuracy is not required for the component parts. Therefore, it is easy to assembly and maintain the clutch 60. In addition, the clutch spring 118 serves not only to urge the clutch pressure plate 74 toward the friction discs 86 and 88 and but also to urge the lifter member 106 against the clutch pressure member to close the outlet ports 74e. Therefore, there is no need to provide an additional spring member for urging the lifter member 106 in a direction to close the outlet ports 74e, and hence the number of the component parts of the clutch 60 is reduced.

Also, as described above, upon movement of the lifter rod 92, the fluid passageway 94b is brought out of registry with the inlet port 66a, so that the supply of the oil from the oil source is positively interrupted, thereby reducing the pressure in the hydraulic pressure chamber 90 without delay. As a result, the clutch 60 can be disengaged quickly since no residual pressure remains in the hydraulic pressure chamber 90. Thus, the movable piece 94 having the fluid passageways 94a and 94b and the hollow output shaft 66 having the inlet port 66a constitute a shut-off valve for shutting off the flow of the pressurized oil.

Oil to be fed to a transmission device (not shown) flows through the hollow output shaft 66, a port 66b, a gap between the bearing 68b and the input gear 64 and a gas, between the drive member 62 and the clutch pressure member 74, and reaches the tubular reinforcement portion 62b and tends to collect on the inner surface thereof. However, by virtue of the provision of the apertures 62d formed through the reinforcement portion 62b, the oil fed thereto is suitably discharged from the drive member 62 through the apertures 62d, so that an undue amount of the oil will not collect in between the drive and driven friction discs 86 and 88, thereby preventing a viscous drag occurring therebetween.

The outer flange 74c of the clutch pressure member 74 is disposed in closely spaced, opposed relation to the outer end of the arms 62c of the drive member 62 to cover them. With this arrangement, when the clutch 60 becomes disengaged so that much oil is discharged from the hydraulic pressure chamber 90, the oil discharged from the outlet ports 74e is deflected and dispersed by the outer flange 74c and therefore will not excessively intrude in between the drive and driven frictional discs 86 and 88, thereby preventing a viscous drag occurring therebetween.

Since the three guide grooves 74f are formed in the surface of the inner radial flange 74b of the clutch pressure member 74 facing the chamber plate 76, the oil in the hydraulic pressure chamber 90 is guided by the guide grooves 74f and is caused to flow smoothly through the apertures 74g and the outlet ports 74e under the influence of a centrifugal force when the clutch 60 becomes disengaged with the lifter member 106. Therefore, the pressure in the pressure chamber 90 is reduced to a predetermined level to effect the disengagement of the clutch satisfactory. Without such guide grooves 74f, the oil in the hydraulic chamber 90 would not be smoothly discharged therefrom particularly when the lifter rod 92 is quickly moved to disengage the clutch 60. As a result, the pressure in the chamber 90 is not reduced to a satisfactory level quickly, thereby causing a drag between the drive and driven friction discs 86 and 88.

The springs 120 serve to properly position the clutch pressure member 74 relative to the clutch lifter member 106 during the transition from clutch engagement to disengagement and vice verse, thereby ensuring that the clutch pressure member 74 is moved accurately in response to the movement of the lifter rod 92 at the start of each of the clutch disengagement and engagement. The lifter member 106 is movable relative to the clutch pressure member 74 a predetermined distance H (FIG. 5). By virtue of the provision of the projection 106e on each of the engaging arms 106d of the lifter member 106, the springs 120 can be suitably provided between the retainer ring 110 and the lifter member 106 without interfering the movement of the lifter member 106 relative to the clutch pressure member 74 by the predetermined distance H. More specifically, when the projections 106e are held in engagement with the retainer ring 110, the radial portion 106a and the retainer ring 110 between which the springs 120 are interposed are spaced apart by a distance h (FIG. 5).

Figure 6:
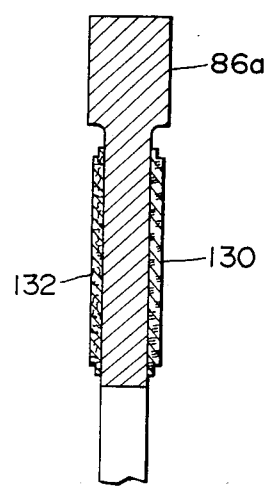
FIG. 6 is a cross-section of an outermost drive friction disc.

As shown in FIG. 6, the outermost drive friction disc 86a has a cork-based facing material 130 on one face directed toward the outer flange 74c of the clutch pressure member 74 and a paper-based facing material 132 on the opposite face thereof. The cork-based facing material 130 is made of cork impregnated with a synthetic resin while the paper-based facing material 132 is made of paper impregnated with a synthetic resin. The cork-based facing material 130 has a relatively small heat capacity and gets excessively hot when subjected to friction, so that it can be easily be worn. Therefore, the outer flange 74c of the clutch pressure member 74 made of aluminum is not subjected to undue wear for a prolonged period of time. On the other hand, the paper-based facing material 132 is subjected to less wear when subjected to friction by a metal face. Also, the innermost drive friction disc 86b has a cork-based facing material on one face directed toward the radial flange 70f of the driven member 70 and a paper-based facing material on the opposite face thereof. Therefore, the radial flange 70f of the driven member 70 made of aluminum is not subjected to undue wear. Each of the other drive frictional discs 86 between the outermost and innermost ones 86a and 86b has paper-based facing materials on opposite faces thereof. The driven frictional discs 88 with which the paper-based facing materials 132 are adapted to be brought into engagement are made of iron.

Figure 7:
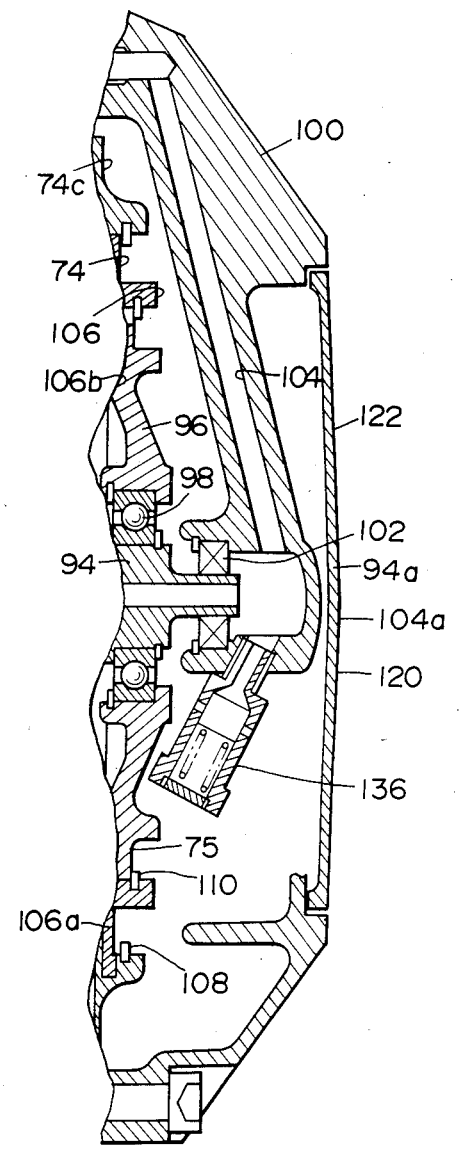
FIG. 7 is a fragmentary view showing a modified hydraulic clutch.

While the clutch according to this invention has been specifically shown and described herein, the invention itself is not to be restricted by the exact showing of the drawings or the description thereof. For example, as shown in FIG. 7, a relief valve 136 of the conventional type may be provided on the clutch cover 100 so as to be connected to the fluid passageway 104 so that the pressurized oil fed from the oil source P can be discharged through the relief valve 136 when the shut-off valve, constituted by the movable piece 94 and the hollow shaft 66, is closed to disengage the clutch 60. Since the relief valve 136 is provided in the cavity 100a of the clutch cover 100, the oil discharged from the relief valve 136 will not reach the drive and driven friction discs 86 and 88 and therefore will not cause viscous drag therebetween.

What is claimed is:

1. A hydraulic clutch comprising:
   (a) a rotatable output shaft;
   (b) a drive member rotatably mounted on said output shaft;
   (c) a driven member fixedly mounted on said output shaft for rotation therewith;
   (d) a plurality of drive friction discs carried by said drive member for rotation therewith and for sliding movement relative thereto along an axis of said output shaft;
   (e) a plurality of driven friction discs carried by said driven member for rotation therewith and for sliding movement relative thereto along the axis of said output shaft, said drive and driven friction discs being disposed alternately in closely spaced relation;
   (f) a chamber plate fixedly mounted on said output shaft and disposed generally perpendicular to the axis of said output shaft;
   (g) a clutch pressure member mounted around said output shaft for movement therealong relative to said chamber plate, said pressure member cooperating with said chamber plate to form a hydraulic pressure chamber, said pressure member having outlet port means communicating with said hydraulic pressure chamber;
   (h) a clutch lifter member mounted around said output shaft for movement therealong;
   (i) urging means normally urging said lifter member against said clutch pressure member to close said outlet port means;
   (j) fluid passageway means connectable to a source of pressurized fluid and communicating with said hydraulic pressure chamber for supplying the pressurized fluid to said hydraulic pressure chamber to increase a pressure in said hydraulic pressure chamber to urge said clutch pressure member toward said alternately-disposed drive and driven friction discs to drivingly couple them, thereby transmitting the rotation of said drive member to said output shaft; and
   (k) actuator means operable to move said lifter member away from said clutch pressure member against the bias of said urging means to open said outlet port means to discharge the pressuried fluid therefrom to reduce the pressure in said hydraulic pressure chamber, so that said clutch pressure member is moved away from said drive and driven friction discs to discouple them.

2. A hydraulic clutch according to claim 1, further comprising a clutch body and a clutch cover removably attached to said clutch body, said fluid passageway means comprising a fluid passageway formed through said clutch cover and having an open end into which a bolt is threaded, there being provided a cover plate removably attached to said clutch cover to cover said open end of said fluid passagway and said bolt.

3. A hydraulic clutch according to claim 1, further comprising a shut-off valve connected to said fluid passageway means for being brought into a closed position shutting off the flow of the pressurized fluid therethrough, said actuator means being operable to bring said shut-off valve into the closed condition when it moves said lifter member away from said clutch pressure member to open said outlet port means.

4. A hydraulic clutch according to claim 1, in which said clutch lifter member includes a radial portion, and a plurality of engaging arms extending radially outwardly from said radial portion in circumferentially spaced relation, said radial portion being normally closing said outlet port means at one face thereof, each of said engaging arm having a projection on the other face of said radial portion, a retaining ring being mounted on said clutch pressure member in opposed relation to said other face of said radial portion, said clutch lifter member being movable relative to said clutch pressure member between said outlet port means and said retaining ring, spring means being interposed between said retaining ring and said other face of said radial portion of said clutch lifter member to apply a preload to said clutch lifter member, and said projections on said engaging arms being engageable with said retaining ring to provide a space between said retaining ring and said other face of said radial portion.

5. A hydraulic clutch comprising:
   (a) a rotatable output shaft;
   (b) a drive member rotatably mounted on said output shaft;
   (c) a driven member fixedly mounted on said output shaft for rotation therewith;
   (d) a plurality of drive friction discs carried by said drive member for rotation therewith and for sliding movement relative thereto along an axis of said output shaft;
   (e) a plurality of driven friction discs carried by said driven member for rotation therewith and for sliding movement relative thereto along the axis of said output shaft, said drive and driven friction discs being disposed alternately in closely spaced relation;
   (f) a chamber plate fixedly mounted on said output shaft and disposed generally perpendicular to the axis of said output shaft;
   (g) a clutch pressure member mounted around said output shaft for movement therealong relative to said chamber plate, said pressure member cooperating with said chamber plate to form a hydraulic pressure chamber;

(h) outlet port means communicating with said hydraulic chamber;

(i) means normally closing said outlet port means;

(j) means operable to act on said closing means to open said outlet port means;

(k) fluid passageway means connectable to a source of pressurized fluid and communicating with said hydraulic pressure chamber for supplying the pressurized fluid to said hydraulic pressure chamber to increase a pressure in said hydraulic pressure chamber to urge said clutch pressure member toward said alternately-disposed drive and driven friction discs to drivingly couple them, thereby transmitting the rotation of said drive member to said output shaft; and (l) a shut-off valve connected to said fluid passageway means and operable to be brought into a closed position to shut off the flow of the pressurized fluid therethrough when said outlet port means is opened.

6. A hydraulic clutch according to claim 1 or claim 5, in which said drive member includes an annular base portion disposed perpendicular to the axis of said output shaft, a tubular reinforcement portion extending from one face of said base portion, and a plurality of circumferentially-spaced axial arms extending from said reinforcement portion in surrounding relation to said drive friction discs, an aperture being formed through said reinforcement portion between each adjacent arms.

7. A hydraulic clutch according to claim 1 or claim 5, in which said drive member includes an annular base portion disposed perpendicular to the axis of said output shaft and a plurality of circumferentially-spaced axial arms formed on one side of said base portion in surrounding relation to said drive friction discs, said clutch pressure member having an outer radial flange disposed in closely spaced, opposed relation to distal ends of said arms.

8. A hydraulic clutch according to claim 1 or claim 5, in which said clutch pressure member has a tubular portion disposed coaxially with said output shaft and an inner radial flange formed on the inner periphery of said tubular portion and disposed in opposed relation to said chamber plate, said tubular portion being slidably fitted around said chamber plate, said tubular portion, said inner flange and said chamber plate cooperating with one another to form said hydraulic pressure chamber, a plurality of hollow portions being formed around said tubular portion and extending along an axis thereof, said hollow portions constituting said outlet port means, a plurality of guide grooves being formed in one surface of said inner flange facing said chamber plate and extending generally radially respectively toward said ports, said grooves being disposed slightly spirally, and a plurality of apertures being formed through said tubular portion adjacent to said one surface of said inner flange and being disposed in registry with radial outer ends of said guide grooves, respectively, to communicate said hydraulic pressure chamber with said hollow portions.

9. A hydraulic clutch according to claim 1 or claim 5, in which said drive member has a disc support portion, said alternately-disposed drive and driven friction discs being pressed together between said support portion and said clutch pressure plate when said clutch pressure member is urged against said friction discs, the two friction discs disposed at opposite ends of the alternately-disposed friction discs having cork-based facing materials on their one faces directed away from each other, said cork-based facing material being made of cork impregnated with a synthetic resin, a paper-based facing material being interposed between each adjacent friction discs, said paper-based facing material being made of paper impregnated with a synthetic resin, said cork-based facing material being more susceptible to wear than said paper-based facing material.

10. A hydraulic clutch according to claim 5 or claim 3, in which said output shaft is of a hollow construction and has an inlet port communicating with said hydraulic pressure chamber, said shut-off valve comprising a movable piece having a fluid passageway communicating with the source of pressurized fluid and received in said hollow output shaft for sliding movement therealong into and out of an operative position where said fluid passageway is disposed in registry with said inlet port for supplying the pressurized fluid into said hydraulic pressure chamber.

11. A hydraulic clutch according to claim 5 or claim 3, further comprising a pressure relief valve connected to said fluid passageway means between the source of pressurized fluid and said shut-off valve for discharging the pressurized fluid when said shut-off valve is in its closed position.

* * * * *